INVENTOR.
JOHN A. TRAVLOS
BY
J Warren Kinney Jr
ATTORNEY

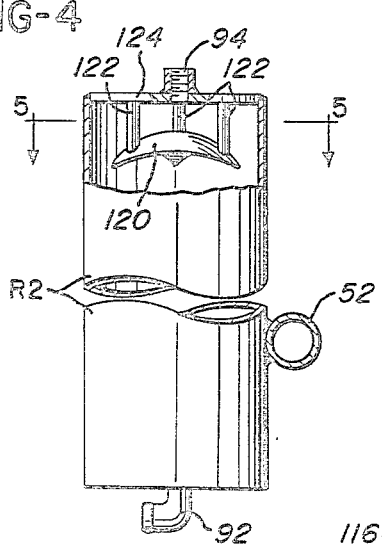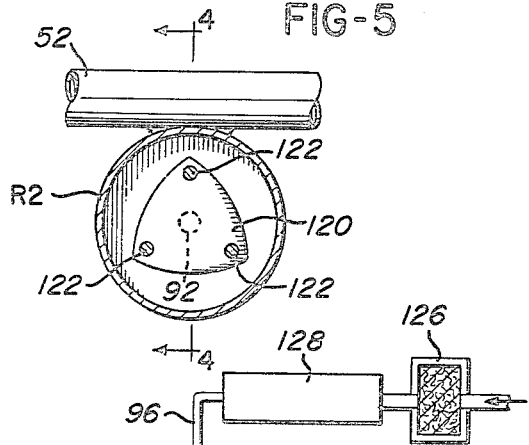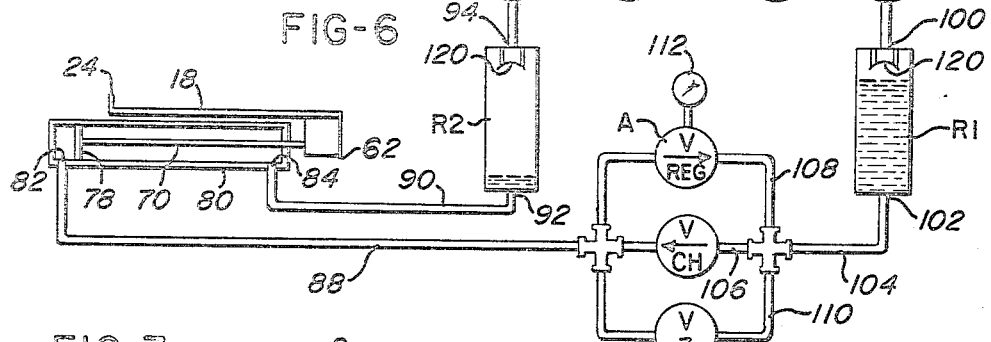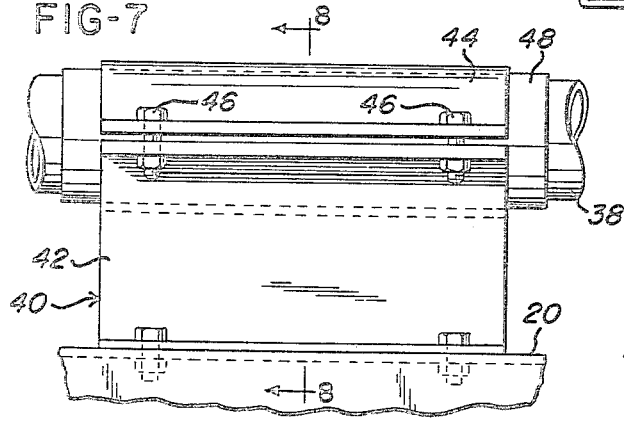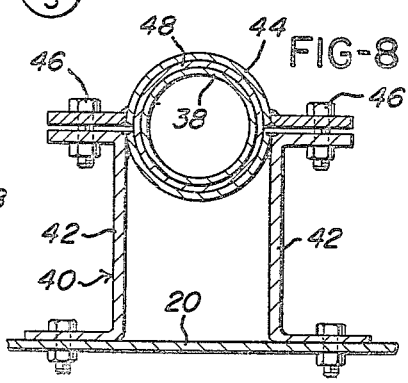

United States Patent Office 3,485,274
Patented Dec. 23, 1969

3,485,274
MOLD LOADER
John A. Travlos, Ottumwa, Iowa, assignor to The Cincinnati Butchers' Supply Company, Cincinnati, Ohio, a corporation of Ohio
Filed Oct. 24, 1966, Ser. No. 588,909
Int. Cl. B67c *3/26, 3/34*
U.S. Cl. 141—263                                   1 Claim

ABSTRACT OF THE DISCLOSURE

The mold loader or stuffer utilizes the accuracy of hydraulic control and metering of incompressible hydraulic fluid through an orifice, for assuring that the density of material stuffed into an elongate mold will be uniform at both ends of the mold. The control is pneumatic-hydraulic, and includes manually operative means facilitating operation of the device by one attendant unassisted, with a minimum of manual effort.

---

This invention relates to a pneumatic-hydraulic mold loader. The device may be used for filling molds with foods such as sausage meat or other food products in semi-solid form subject to molding.

An object of the invention is to provide an improved mold loader, or stuffer, which facilitates and expedites the filling of molds with food products, thereby to minimize the expense and increase the output of the operation.

Another object of the invention is to conserve labor and the manual effort required for the mold filling procedure, while at the same time attaining great accuracy and uniformity in the successive filling of food molds.

A further object is to provide apparatus for the purpose stated, which employs a combination pneumatic-hydraulic control system highly automated and economically effective for operation of the apparatus.

Another object of the invention is to provide for trouble-free dependable operation of the pneumatic-hydraulic control system of the mold loading apparatus.

A further object of the invention is to provide means in a pneumatic-hydraulic control system, for precluding possible erratic functioning of the system due to aeration of the liquid component of the system.

The foregoing and other objects are attained by the means described herein and illustrated upon the accompanying drawings, in which:

FIG. 4 is a side elevation, partly in cross-section, illustrating an improved fluid reservoir constituting a part of the mold loader control system.

FIG. 5 is a cross-section taken on line 5—5 of FIG. 4.

FIG. 6 is a diagrammatic view of the pneumatic-hydraulic control system.

FIG. 7 is an enlarged side elevation of a feed tube mounting head comprising a detail of the mold loader.

FIG. 8 is a cross-section taken on line 8—8 of FIG. 7.

Figure 1:
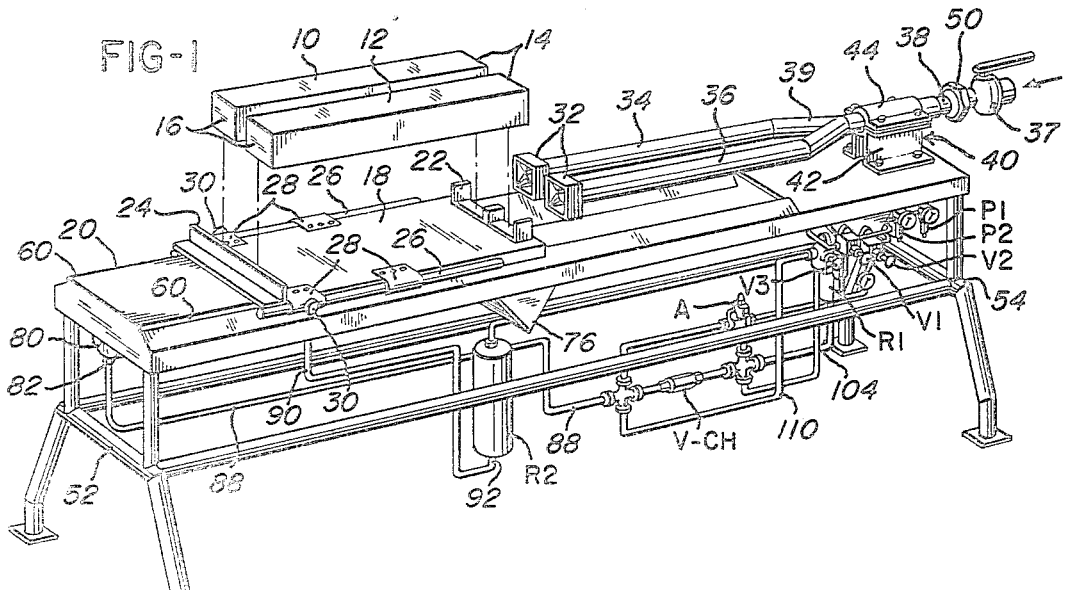
FIG. 1 is a perspective view of the improved mold loader showing a pair of molds displaced in the interest of clarity of disclosure.

In the drawings, the reference characters 10 and 12 denote food molds to be filled with a semi-solid moldable food product such as sausage meat. Each mold may be in the form of an elongate tube open at one end 14, and closed by a bottom member 16 at the opposite end. The molds may be square or rectangular in transverse cross-section, as in the example illustrated, or in some cases may be cylindrical or of other configuration as desired.

It is highly desirable that the molds 10 and 12 be filled with a food product in such manner that the product will have a uniform density throughout the length of the molds, and that molds filled in succession will likewise be uniform as to product density. The attainment of this advantage is one of the objectives of the present invention.

The molds 10 and 12 are adapted for placement upon a carriage 18 which is movable lengthwise of the machine bed 20, between limits not exceeding the length of the molds. The carriage may carry upstanding guides 22 to embrace the open ends of the molds and thereby preclude lateral shifting thereof. At the rear of the carriage, an upstanding stop member 24 may be mounted to abut the rear closed ends of the molds, for precluding longitudinal shifting of the molds in one direction during filling. The stop member conveniently may be in the form of an angle iron as shown, welded or otherwise fixed to the rear end portions of a pair of spaced parallel guide rods 26, which pass through cylindrical guide members 28 secured to the carriage. Two or more of the guide members 28 at opposite sides of the carriage, may be provided with clamp means 30, herein shown as conventional thumb screws or the like, for securing the rods in positions of adjustment longitudinally of carriage 18.

By reason of adjustability of stop member 24 toward and from the guides 22, molds which may vary in length can be accommodated by carriage 18.

When the molds 10 and 12 are properly placed upon the carriage, they align with the heads 32 of a pair of feed tubes 34 and 36, which are spaced apart in parallelism correspondingly with the spacing of the molds one from the other. Heads 32 may snugly but slidably enter the open ends of the molds, and will feed a food product under pressure into the molds simultaneously. The moldable food product may be fed from a source of supply, to the main tube 38, whence it is distributed to feed tubes 34 and 36 through a Y-fitting 39. The source of supply is to be under pressure, and may be controlled by a manual shut-off valve 37.

The main feed tube 38 may be clamped to a head 40 at one end of the machine bed, for maintaining the tubes 34 and 36 in position to enter the molds 10 and 12. Head 40 may comprise a rigid standard 42 fixed to the bed, and having a cap 44 to clamp the tube 38 upon the standard by means of clamp screws 46. Tube 38 may be reinforced to prevent crushing, by surrounding said tube with a short protective tube section 48. A coupler 50 may connect tube 38 to a source of supply of food product under pressure. The bed of the machine may be supported above floor level by means of leg structures 52 and 54.

Figure 3:
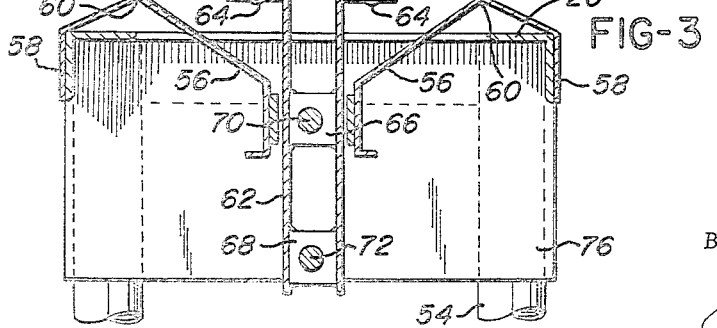
FIG. 3 is an enlarged cross-section taken on line 3—3 of FIG. 2.

FIG. 3 illustrates a means of supporting the carriage 18 for shifting movement lengthwise of the machine bed. Said means may comprise a pair of elongate aprons 56 secured at 58 to the bed, and having apices 60 upon which the carriage may slide. The aprons may depend to a position at opposite sides of a depending frame 62 which frame is secured to the lower face of carriage 18 at 64. Frame 62 may carry pairs of fixed bearing blocks 66 and 68. Blocks 66 are secured to one end of a hydraulic motor piston rod 70, and blocks 68 are slidable upon a guide rod 72 which is fixed at opposite ends to the bed of the machine, at locations 74, 74. The characters 76 indicate stationary gussets for reinforcing the guide rod connections at 74, 74.

A hydraulic motor cylinder 80 fixed to the machine bed, contains the piston 78 carried by rod 70. At opposite ends of cylinder 80 are ports 82 and 84, for the feed and exhaust of a non-compressible liquid, for example an oil or the like. By feeding liquid to one port and exhausting it through the other port, piston 78 and piston rod 70 may be actuated for moving carriage 18 and the molds supported thereon, lengthwise of the machine bed. Reciprocative movement of the carriage is effected by reversing the feed through ports 82 and 84.

Figure 2:
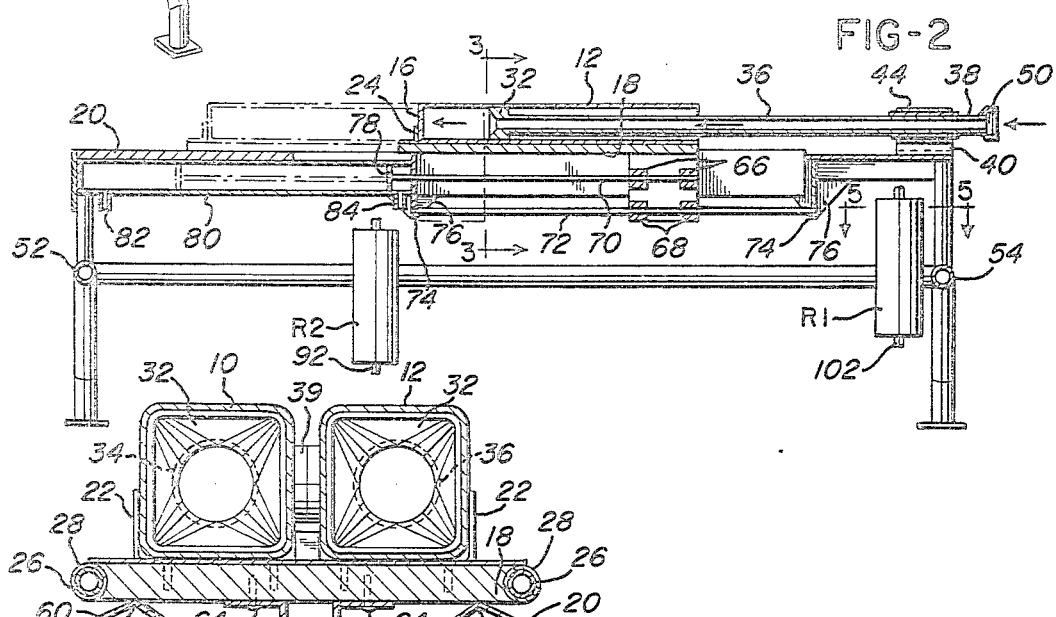
FIG. 2 is a longitudinal cross-section of the loader, with the molds in loading position.

It may here be noted that a loading cycle begins with having the molds 10 and 12 supported upon carriage 18; then hydraulic cylinder 80 is to be energized for advancing the carriage and the molds to the right, for disposition of feed heads 32 well into the interior of the molds, substantially according to FIG. 2. Then, as the next step, a valve 37 is to be opened for establishing a feeding of food product through tubes 38, 34 and 36, so that heads 32, 32 will discharge the product into the closed ends of molds 10 and 12, simultaneously. The discharge will build up a force within the molds, capable of moving the carriage in a direction away from heads 32.

As the carriage is moved by the force of food product admission, the movement will be resisted by a counterforce set up within the hydraulic cylinder. The counterforce is to be relieved at a predetermined rate during filling of the molds, so as to establish a predetermined density of food product admitted to the molds. The desired density of product is controlled by controlling the rate at which hydraulic fluid is permitted displacement at opposite ends of the hydraulic cylinder.

When the molds are filled to a desired extent, the operator of the machine may discontinue the feed of food product through valve 37 and feed tube 38, and then initiate a final withdrawal of the carriage to free the molds from association with the feed heads 32, 32. Thereupon, the loaded molds may be lifted from the carriage 18, and replaced with empty molds to be loaded. The cycle above recited may then be repeated, to load the second set of molds.

The control mechanism for performance of the loading cycle is best illustrated by FIG. 6, wherein 88 and 90 indicate hydraulic fluid lines connected to the cylinder ports 82 and 84, respectively. Line 90 is connected to the lower port 92 of an upright reservoir R2 containing, preferably, an incompressible oil. The upper port 94 of this reservoir has connection with a manually operative air control valve V2, which receives air under pressure from a supplying pipe 96, through a pressure regulating valve P2. Valve P2 preferably is fitted with a pressure indicating gage 98.

Pneumatic supply line 96 is connected to a pressure regulating valve P1, which delivers air pressure to a manually operative valve V1. From valve V1, air may pass to the upper port 100 of an upright reservoir R1 for oil, so that pressure of air in the head end of the reservoir may displace oil through the lower port 102 and effect delivery thereof to a valve system by way of pipe 104.

The valve system mentioned may comprise a one-way flow pipe 106 fitted with a one-way check valve V-CH permitting flow to pipe 88, but precluding back-flow to reservoir R1. Around the check valve are arranged a flow control shunt pipe 108, and a manual valve controlled shunt pipe 110. In shunt pipe 108 is incorporated a pressure-responsive one-way valve A equipped with a pressure gage 112. The other shunt pipe 110 incorporates a manually operative valve V3.

From the foregoing, it will be understood that flow of oil from the hydraulic cylinder by way of pipe 88, may not pass through check valve V-CH to reach reservoir R1, however, with valve V3 closed, oil may pass through pressure-responsive, one-way valve A when pressure of oil in pipe 88 reaches the pressure at which valve A is set to open. Alternatively, the opening of manual valve V3 will permit oil to by-pass valve A, and pass directly to reservoir R1.

From the diagram, FIG. 6, it is apparent that in the illustrated condition of hydraulic cylinder 80, reservoir R1 will be substantially fully charged with oil, whereas in reservoir R2 the level of oil will be minimal. With valve V3 closed, an attendant may open valve V1 to release pressured air into the top of reservoir R1, this resulting in displacement of oil from reservoir R1, through check valve V-CH, and into the hydraulic cylinder by way of pipe 88 and port 82, to relatively rapidly advance piston rod 70 and carriage 18 to the right. Concurrently, oil behind the piston 78 will be displaced into reservoir R2 by way of pipe 90 and reservoir port 92.

The above described advancement of rod 70 and carriage 18, places the molds 10 and 12 in the position of FIG. 2, and in readiness for injection of a food product into the molds. An attendant thereupon closes valve V1 and opens a valve 37 in the food product supply line, to initiate charging of the molds 10 and 12 through heads 32, 32.

As pressure of food product builds up within molds 10 and 12, carriage 18 begins to retract (toward the left in FIG. 2), causing piston 78 to displace oil through hydraulic cylinder port 82, pipe 88, and pressure-responsive valve A, for transfer of oil to the lower end of reservoir R1. Valve V3 is assumed closed, as is also check valve V-CH. The movement of oil through valve A is controlled by the setting of the spring pressure within said valve A, which in turn controls the density of food product fed into molds 10 and 12 as carriage 18 retracts or recedes.

During the transfer of oil between reservoirs R1 and R2, the upper portions of the reservoirs may be exposed to atmosphere, through relief ports 114 and 116 which are open when valves V1 and V2 are closed.

As soon as the attendant determines that molds 10 and 12 are charged to the desired extent, he closes off the supply of food product at valve 37. Then, to fully retract the carriage for removal of the molds, the attendant may momentarily open valve V2 and thereby effectuate the full retraction of the carriage. The loaded molds may then be removed from the carriage and replaced with empty molds, in readiness for a subsequent loading operation.

From the foregoing, it should be understood that the entire mold-loading operation is performed with minimal effort on the part of an attendant, and a desired density of the product injected into the molds is accomplished automatically. The operation is performed speedily and with great accuracy of results, all of which is necessary to economical operation, and uniformity in the weight, consistency, and quality of the product delivered.

The control system of FIG. 6 is capable of an alternative method of operation, in that recession of the carriage 18 may be placed under the control of valves V2 and V3, with valve A remaining inactive. Under the alternative procedure, valve V3 may be fully opened by the attendant, who may then manipulate valve V2 to limit the rate of recession of piston 78 and carriage 18 toward the left in FIG. 2. No oil then may flow through pressure-responsive valve A, but will flow instead through valve V3. The rate of recession, in this instance, may be controlled by the setting of air-pressure regulating valve P2. Valve V2 may be used for controlling any recessive movement of the carriage which may be desired.

With reference now to FIGS. 4 and 5, there is illustrated an improved construction of the oil reservoir R2, which is applicable also to reservoir R1, whereby the hydraulic portion of the control system is improved in operation. As was previously pointed out herein, pneumatic pressure is introduced to the upper portion of the reservoir through port 94. If the air introduced strikes the surface of the oil in the reservoir as a jet, it tends to mix with and aerate the oil, thereby reducing incompressiblity of the oil and adversely affecting positive driving of the hydraulic cylinder piston.

To solve the problem mentioned, a baffle 120 is interposed between port 94 and the level of oil in the reservoir, so as to convert the entering jet air stream into a diffused spray of air having a greatly reduced force of contact with the oil. Baffle 120 may be in the form of a convex plate suspended, as by means of hangers 122, from the solid closure cap 124 or top of the reservoir body. The plate, though shown as triangular, may be of any acceptable shape which will expose its convex face to port 94 and direct the incoming air downwardly in a diffused condition along the side wall of the reservoir. Air so entering the reservoirs R1 and R2 produces no appreciable aeration of the oil within the reservoirs, and accordingly, the expected positive and dependable movements of the hydraulic motor are ensured and preserved, to great advantage.

It may here be noted that air from a compressor or other source of supply, and entering the pipe 96, may desirably be treated by means of a filter and a lubricator, shown conventionally at 126 and 128, respectively.

The apparatus herein disclosed greatly increases the production speed of molded food products, and enhances the quality thereof, with substantial savings of time, labor, and expense. The apparatus may easily be operated by one attendant without the aid of an assistant, to produce a superior product of uniform consistency.

It is to be understood that various modifications and changes may be made in the structural details of the apparatus, within the scope of the appended claim, without departing from the spirit of the invention.

What is claimed is:

1. Apparatus for the stuffing of an elongate open-end mold with moldable semi-solid material, comprising in combination: an elongate stationary bed; a carriage near one end of the bed and mounted thereon for shifting movement longitudinally of the bed; means for supporting lengthwise upon the carriage an elongate mold having an open end and a closed end; a normally stationary feed tube for moldable material under pressure, said feed tube having an open end aligned with and receptive in the open end of the mold, for delivering moldable material under pressure against the closed end of the mold, the carriage being retractable progressively away from the feed tube by force of the feed of material impacted continuously against the closed end of the mold; a double-acting hydraulic cylinder mounted on the bed, a piston reciprocating within the cylinder and drivingly connected to the carriage to shift the same, a hydraulic circuit connected to the cylinder to drive the piston in either direction, manually controllable pneumatic means causing the hydraulic circuit to drive the piston and carriage in a forward direction to place the feed tube within the mold, and controllable valve means within the hydraulic circuit to retard the movement of the piston and carriage in a reverse direction as the material is fed into the mold, one valve means being a manually operated valve and another valve means being an adjustable one-way pressure responsive valve thus establishing a uniform density of the material being fed into the mold.

References Cited

UNITED STATES PATENTS

| 3,187,957 | 6/1965 | Rose | 141—68 X |
| 3,274,902 | 9/1966 | Kleckner | 91—480 |
| 3,371,690 | 3/1968 | Hawley | 141—283 X |

HOUSTON S. BELL, JR., Primary Examiner

U.S. Cl. X.R.

141—283